W. W. STODDARD.
LATHE.
APPLICATION FILED NOV. 27, 1914.

1,186,503.

Patented June 6, 1916.

Witnesses
Leonard A. Powell,
Herman R. Hoffman

Inventor
Wallace W. Stoddard,
by his attorney
Charles S. Goodwin

UNITED STATES PATENT OFFICE.

WALLACE W. STODDARD, OF BINGHAM, MAINE.

LATHE.

1,186,503. Specification of Letters Patent. Patented June 6, 1916.

Application filed November 27, 1914. Serial No. 874,131.

*To all whom it may concern:*

Be it known that I, WALLACE W. STODDARD, a citizen of the United States, residing at Bingham, in the county of Somerset and State of Maine, have invented new and useful Improvements in Lathes, of which the following is a specification.

This invention relates to improvements in lathes.

In the usual and wellknown types of lathes, the tailspindles are reciprocated in the tailstock to move the dead center into contact with the work by a screw to which a rotary motion is imparted by means of a hand wheel attached to one end of said screw. The operation of a spindle by such a means is necessarily slow and consequently a great deal of time is wasted by the operator in setting up the work in the lathe and removing the same after the work is finished, as several turns must be given to the hand wheel each time the spindle is moved.

The object of this invention is to provide a lathe comprising the usual adjustable tailstock and a spindle movable longitudinally of said tailstock, but by providing fluid operated instrumentalities by means of which said spindle may be quickly and easily adjusted to engage, hold or release the work in the lathe by the simple rocking of a lever or the opening and closing of a valve.

Another object of the invention is to provide instrumentalities, of the nature hereinbefore set forth, which may be mounted upon the tailstock of the lathe and adjusted therewith to within the range of the work to be operated upon without interfering with the subsequent operation of the tailspindle by said fluid operated means.

The invention consists in the combination and arrangement of parts, whereby the above objects and certain other objects hereinafter appearing may be attained as set forth in the following specification and particularly pointed out in the claims.

Figure 1:
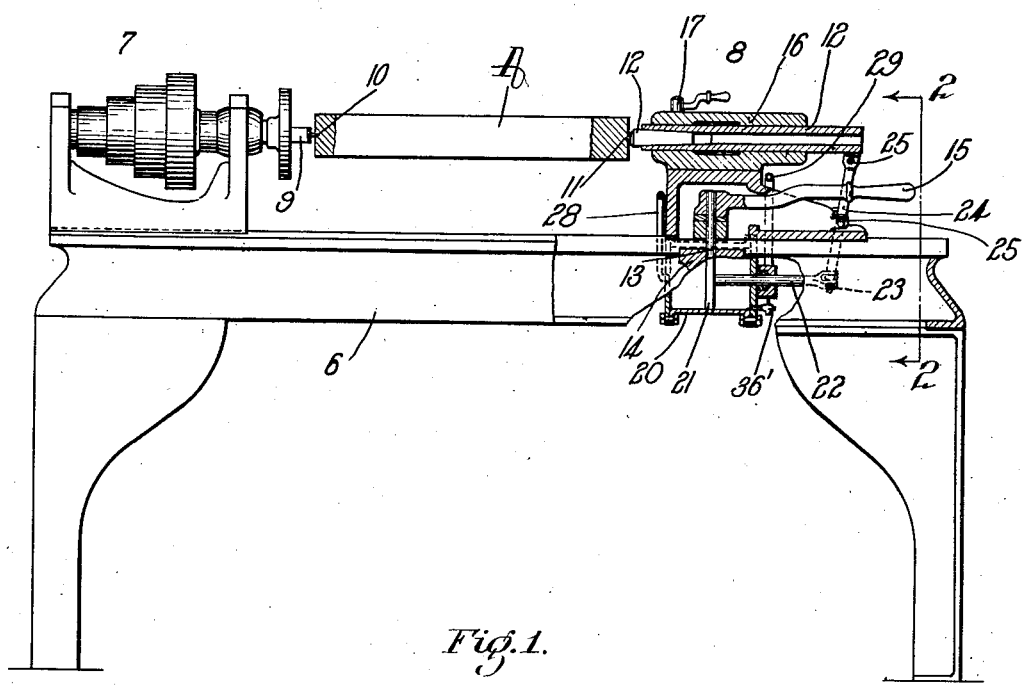
Figure 2:
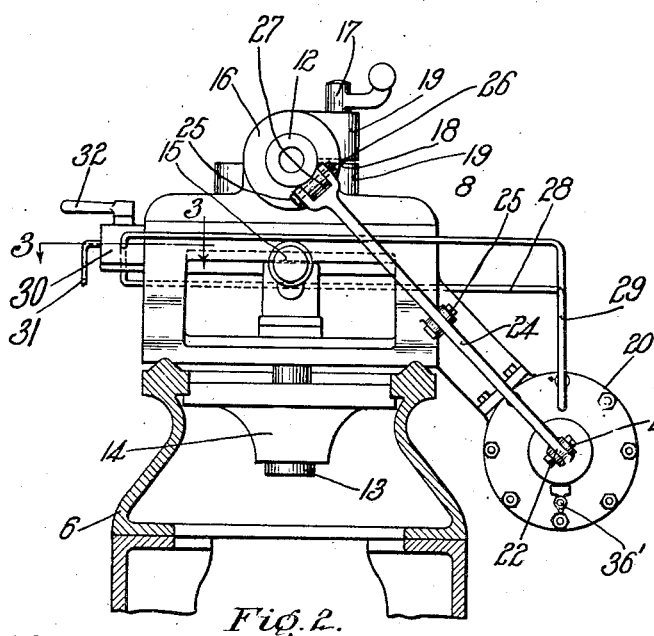
Figure 3:
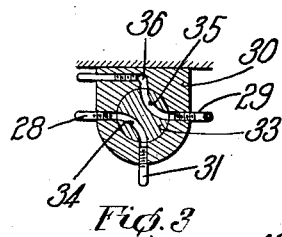
Figure 4:
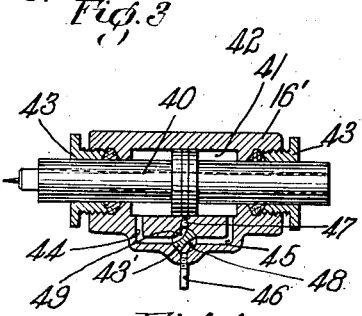

Referring to the drawings: Figure 1 is a side elevation of a lathe embodying my invention, portions of the tailstock of said lathe and the guideways being broken away and shown in section to more clearly illustrate the invention. Fig. 2 is a section, partly in elevation taken on line 2—2 of Fig. 1. Fig. 3 is a section taken on line 3—3 of Fig. 2 illustrating the operating valve. Fig. 4 illustrates another method of operating the tailspindle by compressed air or other suitable fluid.

Like numerals refer to like parts throughout the several views of the drawings.

In the drawings, 6 is the bed of a lathe, which, in other words, constitutes the guideway or shears. Upon the bed 6 are mounted a headstock 7 and a tailstock 8, said headstock being stationary thereon, while the tailstock is adapted to be moved longitudinally of said bed. The headstock is provided with a live spindle 9 driven in the usual manner. The work to be performed on the lathe is carried between the center 10 of the live spindle 9 and a dead center 11 of a tailspindle 12, which is arranged to reciprocate longitudinally in the tailstock 8. To maintain the axes of the live and tailspindles 9 and 12 in alinement, the head and tailstocks are fitted to the guideway or shears 6, said headstock being fixed in position thereon, while the tailstock is made adjustable along said shears to suit the length of the work.

To lock the tailstock 8 in position, said tailstock 8 has a bolt 13 projecting through a plate 14 arranged beneath the shears 6, said bolt having at its upper end a hand lever 15 adapted to be operated to move said plate against said shears and clamp said tailstock in a predetermined position.

The adjustment of the tailstock as a whole is for the purpose of bringing the tailspindle in the neighborhood of the work, but the final adjustment, whereby said spindle is moved to engage the work and support the same during the operation thereon, is accomplished by a separate movement of said spindle independently of the tailstock. To accomplish this result the tailspindle is arranged to slide longitudinally in the bearing 16 of said tailstock and may, if desired, be clamped in engagement with the work by means of a lever 17 having a screw 18 which engages ears 19 on said bearing 16, said bearing being split at the forward end thereof to permit said ears to be drawn together. Thus far the construction of the lathe is ordinary.

The important feature of the invention resides in the fluid operating instrumentalities or mechanism which is adapted to reciprocate the tailspindle longitudinally of the bearing 16, which mechanism preferably consists of a fluid cylinder 20 secured to the tailstock, preferably at the rear of the lathe. A piston 21 is arranged to reciprocate within said cylinder to which piston is secured a piston rod 22 extending through one end of said cylinder and pivotally connected at 23 to a lever 24, which in turn is pivoted at 25 to the tailstock 8. The opposite end of the lever 24 is pivoted at 26 to a projection 27 depending from the tailspindle 12. Fluid is supplied to the cylinder 20 to operate said piston and thus move the tailspindle 12 into contact with the work "A" through a fluid or air supply pipe 28, which pipe extends from the left hand end of the cylinder 20 in Fig. 1 to a valve 30 arranged at some suitable or convenient location, preferably upon the front side of the tailstock 8, fluid being supplied to the valve 30 through a supply pipe 31, which is connected with any suitable source of supply not shown in the drawings.

The valve 30 may be of any of the well known types of valves capable of being operated by a slight movement, preferably by a hand lever 32. In the present instance the valve 30 consists of a rotary member 33 provided with a pair of transverse passages 34 and 35. The lever 32 is secured to the upper end of the rotary member 33 and by a slight rocking movement of said rotary member the passage 34 in said rotary member may be moved to connect the supply pipe 31 with the pipe 28, whereby air or fluid may be directed into the cylinder 20 and the piston therein moved to cause the tailspindle to engage the work. By retaining the rotary member in the position just referred to, the pressure of air on said piston will maintain the tailspindle in its engagement with the work and thus hold the work in position while it is being operated upon. Extending from the opposite end of the cylinder 20 from that to which the pipe 28 is connected is a pipe 29 which also extends to the valve 30.

An exhaust passage 36 is provided for the valve 30 and in such relation with the other pipes that when the rotary member is moved to aline the passage 34 with the pipes 31 and 28, the passage 35 in said member will be simultaneously alined with the pipe 29 and the exhaust passage 36, thus permitting the fluid, which is at the front of the piston 21 during the operation of said piston, as hereinbefore stated, to be discharged from said cylinder.

Upon the completion of the operation upon the work "A" and it is desirable to remove the same from the lathe to make room for a new piece, the valve member 33 may be rotated and the supply of air cut off from the pipe 28 permitting the tailspindle to be retracted. The retraction of said tailspindle may be accomplished in numerous ways, such for instance as by hand and in which case the passage 34 in the rotary member 33 must be moved to connect the pipe 28 with the exhaust pipe 36, permitting the air to escape from the cylinder through said exhaust pipe. Should this method of releasing or retracting the tailspindle be employed, the passage 35 must be omitted from the rotary member 33 and in its stead a petcock 36' is provided in the right end of the cylinder 20, (see Fig. 1) which must remain open during the reciprocations of the piston 21 so as to permit the free access of air to that end of the cylinder.

The preferred method of operating the tailspindle to retract the same from the work is by air pressure and in substantially the same manner in which the tailspindle is operated to engage and hold the work in the lathe. This operation is accomplished by moving the rotary member 33 until the passage 35 therein connects the supply pipe 31 with the pipe 29 and the passage 34 with the pipe 28 and exhaust passage 36, thus reversing the action of the piston 21, it being understood that during this operation the petcock 36' remains closed.

The general operation of the device hereinbefore described is as follows: The work, which is indicated at "A", is placed against the live center 10 and the tailstock 8 moved in the usual manner along the guideway 6 into a position adjacent the opposite end of the work, where said tailstock is clamped by the lever 15 and plate 14 after which the tailspindle 12 may be moved relatively to said tailstock to engage said work. To perform the latter operation the handle 32 is rocked until pipe 28, leading from the valve 30 to the left hand end of the cylinder 20, is connected with the supply pipe 31 through the passage 34 permitting fluid of a suitable nature, preferably compressed air, to enter said casing through said valve and operate the piston 21 and through said piston rod 22 and lever 24, which are all operatively connected to the tailspindle 8, to move said tailspindle and its dead center 11 into contact with said work. The pressure of air against said piston is sufficient to retain said spindle in said latter position until the work has been completed, after which the lever 32 may be moved in the opposite direction and the pipe 28 connected through the passage 35 to the exhaust passage 36, while the fluid supply pipe 31 is connected to the pipe 29, permitting fluid to enter the cylinder 20 against the opposite end of the piston 14 and reverse the action of said piston thus to withdraw the dead center 11 from the work to be removed from the machine and a new piece inserted.

It will be readily seen that with the mechanism hereinbefore described that the operation of the tailspindle may be performed very easily and with a much less waste of time than would be possible in the ordinary method of operating tailspindles, which is by means of a hand wheel and screw.

In Fig. 4 I have illustrated a modified form of my invention and in which form a tailspindle 40 is arranged to reciprocate in a bearing 16', similar to the bearing 16 illustrated in Fig. 1, but differing by reason of the fact that said bearing 16' is made slightly larger and provided with a chamber 41 within which a piston 42, preferably formed upon the spindle 40, is arranged to reciprocate. Suitable packing rings 43 are provided at opposite ends of the chamber 41 to prevent leakage of the fluid around said spindle 40. A rotary valve 43' is arranged in the suitable casing formed in said bearing and in which casing are also formed passages 44 and 45 leading from the rotary valve 43' to opposite ends of the chamber 41 or upon opposite sides of the piston 42. A supply pipe 46 leads to the valve 43' and an exhaust passage 47 is also connected therewith. Passages 48 and 49 are arranged in the valve 43'. At certain times in the operation of the lathe the valve 43' is operated to admit fluid through the passages 45 and 48 and pipe 46 to operate the dead spindle 40 in the direction of the work, while the other passage 49 permits the fluid at the opposite side of the piston 42 to escape through the passages 44 and 49 and exhaust passage 47. After the work has been finished the valve 43' is again operated to admit the fluid to the opposite side of said piston 42 to reverse the action of said piston, thus releasing the work.

Having thus described my invention what I claim and desire by Letters Patent to secure is:

1. A lathe having, in combination, a tailspindle, a cylinder, a piston arranged within said cylinder and operatively connected with said tailspindle, and a fluid valve connected with said cylinder adapted to be operated to admit fluid to said cylinder to move said piston, whereby said spindle may be moved to engage and hold the work.

2. A lathe having, in combination, a guideway, a tailstock adjustably mounted on said guideway, a tailspindle arranged to reciprocate in said tailstock, and fluid operating means adapted to move said tailspindle relatively to said tailstock to engage and hold the work on said lathe.

3. A lathe having, in combination, a guideway, a tailstock adjustably mounted on said guideway, a tailspindle arranged to reciprocate in said tailstock, and fluid operating means carried by said tailstock adapted to move said tailspindle relatively to said tailstock to engage and hold the work on said lathe.

4. A lathe having, in combination, an adjustable tailstock, a spindle arranged to reciprocate longitudinally in said tailstock, a fluid cylinder mounted on said tailstock, a piston adapted to reciprocate in said cylinder, a lever operatively connecting said piston and said spindle, and a valve adapted to admit fluid to said cylinder to reciprocate said piston whereby said spindle may be moved to and from the work on said lathe or held in contact with said work during the operation thereon.

5. A lathe having, in combination, a tailstock, a spindle adapted to slide longitudinally in said tailstock, a cylinder mounted on said tailstock, a piston arranged to reciprocate in said cylinder, a lever pivotally mounted on said tailstock and pivotally connected with said piston, and said spindle, said lever adapted to transmit the motion of said piston to said spindle, and a valve adapted to be operated to admit fluid to said cylinder to move said piston in opposite directions.

In testimony whereof I have hereunto set my hand in presence of two subscribing witnesses.

WALLACE W. STODDARD.

Witnesses:
W. B. GOODRICH,
B. M. STEWARD.